UNITED STATES PATENT OFFICE.

JAMES E. BROWN, OF PHILADELPHIA, PENNSYLVANIA.

IMPROVED ARTICLES OF FOOD AND DIET FROM CEREALINE.

Specification forming part of Letters Patent No. 43,091, dated June 14, 1864.

*To all whom it may concern:*

Be it known that I, JAMES E. BROWN, of the city and county of Philadelphia, and State of Pennsylvania, have invented a certain new and useful Improvement in the Procuring of Cerealine and its Manufacture into Articles of Food; and I do hereby declare that the following is a full and correct description thereof.

Cerealine is a substance analogous to gluten, but distinct therefrom, which is ascertained by chemical investigations to be the nutritive and digestive principle of wheat and other grains. It has been recently discovered; and prior to such discovery of its existence nearly the whole of it had been lost in ordinary miller's bran and treated as offal or fed to beasts. When originally discovered it was obtained, although along with many impurities, by regrinding the ordinary miller's bran and then bolting it one or more times; and the sole purpose for which it was thus obtained was to use a portion of it among the ordinary ingredients for bread-making by mixing it with the dough in a certain proportion after the process of fermentation in the dough had progressed to a certain point, it having been found that an excess of cerealine in the dough had the effect of darkening the flour after fermentation, in consequence of which result the cerealine could not thus be wholly utilized. By my invention or discovery, however, the cerealine is obtained in an entirely different mode, in a much purer form, and in such quantities that it may be employed in any proportion desired as the basis of articles of food and diet, specially prepared, as hereinafter mentioned, for developing and applying the valuable qualities of this substance to household use and the purposes of hospitals, sick-rooms, and nurseries.

My mode of procuring the cerealine for the purposes named is as follows: The wheat or other grain is first deprived of its external coat or bran by means of a machine constructed according to Letters Patent of the United States granted to Samuel Bentz for an improved hulling-machine, bearing date February 11, 1862, and numbered 34,346, or by any other mode. The grain being thus unbranned is ground in an ordinary flour-mill, and the meal produced is bolted in the usual manner.

I have found by experience that it is preferable then to regrind the coarser products of the bolting, consisting of starch, gluten, and cerealine, and to bolt them again, although this is not essential. The coarser products of the bolting will in either case be found to contain the cerealine in a much larger proportion than the finer grades.

As the cerealine has been found to be soluble in water, while the gluten and woody fiber with which it is associated in those products are not soluble, I procure the cerealine by dissolving the soluble portions of such coarser products in water, which water I then evaporate to dryness when the cerealine is wanted in a dry form; but when a paste containing cerealine is wanted I use the solution of the cerealine to compose the paste. The cerealine, when thus procured in a dry state, may be put up in packages for use, or it may be mixed with the finer products of the bolting, consisting of cerealine, starch, and gluten, and put up in a pulverulent form; or the finer grades of the products above mentioned may be mixed with the water containing the cerealine in solution and converted into a paste, which may be rolled or pressed and cut into wafers or cakes of desired forms and sizes, or, by a vermicelli-machine, may be made into tubular or vermicular forms, which, when dry, will be ready for use.

In this way the cerealine, which is, physiologically considered, the most valuable element in grain, by being converted into convenient and portable forms, ready for sale and use, is completely utilized for the purposes of food and nourishment and applied to the human system in its most beneficial and nutritive condition. The articles thus produced, owing to the presence therein of a large proportion of glutinous ingredients, are peculiarly adapted for shipment to warm climates or on long voyages, as they will keep without deterioration for long periods of time. In their dietetic use they possess all of the merits and none of the disadvantages attending the ordinary miller's bran, which is so frequently prescribed for dyspepsia. The woody and silicious portions of the bran are irritating and injurious to the stomach; but these are all removed by my method of preparing the articles, and the benefit of the cerealine, which is the valuable element in the bran, is thus obtained in its fullest extent and without the accompanying disadvantages.

Having thus described my invention, what I claim as new therein, and desire to secure by Letters Patent, is—

The procuring of cerealine from the meal of unbranned wheat or other grains by bolting and dissolving the same, and its manufacture into articles of food and diet, substantially in the manner and for the purposes hereinabove set forth.

In testimony whereof I have signed my name to this specification in the presence of two subscribing witnesses.

JAMES E. BROWN.

Witnesses:
  HENRY HOWSON,
  EDM. F. BROWN.